United States Patent [19]
Vertemara et al.

[11] Patent Number: 6,091,222
[45] Date of Patent: Jul. 18, 2000

[54] STATISTICAL PHASE DETECTION AND GO START-UP ALGORITHM

[75] Inventors: Carlo Vertemara; Paolo Menegoli, both of San Jose, Calif.; Massimiliano Brambilla, Milan, Italy

[73] Assignee: STMicroelectronics, Inc., Carrollton, Tex.

[21] Appl. No.: 08/884,879

[22] Filed: Jun. 30, 1997

[51] Int. Cl.[7] .................................................. H02P 1/46
[52] U.S. Cl. .......................................... 318/701; 318/254
[58] Field of Search .................................. 318/701, 254

[56] References Cited

U.S. PATENT DOCUMENTS

| | | | |
|---|---|---|---|
| 3,529,220 | 9/1970 | Kobayashi et al. | 318/138 |
| 3,795,848 | 3/1974 | Schaub | 318/138 |
| 4,004,202 | 1/1977 | Davis | 318/138 |
| 4,145,643 | 3/1979 | Maeda et al. | 318/696 |
| 4,158,795 | 6/1979 | Tarumi et al. | 318/138 |
| 4,162,435 | 7/1979 | Wright | 318/138 |
| 4,262,237 | 4/1981 | Gelenius | 318/254 |
| 4,603,283 | 7/1986 | Oltendorf | 318/254 |
| 4,617,499 | 10/1986 | Yuasa | 318/254 |
| 4,692,674 | 9/1987 | Packard et al. | 318/254 |
| 4,876,491 | 10/1989 | Squires et al. | 318/138 |
| 4,992,710 | 2/1991 | Cassat | 318/254 |
| 5,001,405 | 3/1991 | Cassat | 318/254 |
| 5,028,852 | 7/1991 | Dunfield | 318/254 |
| 5,117,165 | 5/1992 | Cassat et al. | 318/254 |
| 5,191,270 | 3/1993 | McCormack | 318/254 |
| 5,221,881 | 6/1993 | Cameron | 318/254 |
| 5,254,914 | 10/1993 | Dunfield et al. | 318/254 |
| 5,294,877 | 3/1994 | Cameron | 318/809 |
| 5,306,988 | 4/1994 | Carobolante et al. | 318/254 |
| 5,309,078 | 5/1994 | Cameron | 318/811 |
| 5,317,243 | 5/1994 | Cameron | 318/254 |
| 5,343,127 | 8/1994 | Maiocchi | 318/254 |
| 5,397,972 | 3/1995 | Maiocchi | 318/439 |
| 5,497,064 | 3/1996 | Sistine | 318/701 |
| 5,569,990 | 10/1996 | Dunfield | 318/254 |
| 5,598,071 | 1/1997 | Dunfield et al. | 318/254 |
| 5,841,252 | 11/1998 | Dunfield | 318/254 |

FOREIGN PATENT DOCUMENTS 54-136615  10/1979  Japan.

OTHER PUBLICATIONS

Acarnley et al., "Detection of Rotor Position in Stepping and Switched Motors by Monitoring of Current Waveforms," *IEEE Transactions on Industrial Electronics*, vol. IE–32, No. 3, Aug. 1985, pp. 215–222.

*Primary Examiner*—Brian Sircus
*Attorney, Agent, or Firm*—David V. Carlson; Theodore E. Galanthay; Lisa K. Jorgenson

[57] ABSTRACT

A method for starting a polyphase DC motor having a rotor. The position of the rotor is detected by initiating current in each of the phases of the motor and measuring a time period between the initiation of current in the coil and an instant when the current exceeds a threshold current. The phase in which the current reaches the threshold in the shortest amount of time is the phase closest to the position of the rotor. A phase closest to the position of the rotor is identified in each of an odd number of trials, and a starting phase is selected as the phase identified in the majority of trials. The motor is started by providing current to the starting phase.

16 Claims, 5 Drawing Sheets

STATISTICAL PHASE DETECTION AND GO START-UP ALGORITHM

TECHNICAL FIELD

This invention relates to the operation of a polyphase DC motor, and more particularly, to a method and an apparatus for starting a rotation of a rotor in a polyphase DC motor.

BACKGROUND OF THE INVENTION

Polyphase DC motors, and more particularly three-phase DC motors of the brushless, sensorless type, are widely used in computer system disk drives, such as floppy disk, hard disk, or CD ROM drives, as well as in other applications. Three-phase DC motors may be modeled as having a stator with three coils connected in a wye configuration. A conventional three-phase DC motor is shown schematically in FIG. 1 including a rotor 1 situated inside three coils 2, 3, and 4. The rotor includes a N–S magnetic set 5 and rotates as the coils 2, 3, and 4 are provided with current in a sequence.

Typically a larger number of stator coils are employed with multiple motor poles. In conventional applications, eight pole motors are used having twelve stator windings and four N–S magnetic sets on a rotor, resulting in four electrical cycles per revolution of the rotor. The twelve stator windings, or coils, are modeled as four groups of coils, each group being arranged as a set of three wye connected coils. Each of the three coils in the wye configuration is joined at one end to a common node, or a center tap, and an opposite end of each coil is connected between a high side driving transistor and a low side driving transistor. The driving transistors are typically n-channel MOS transistors, although other types of transistors may be used. The center tap may be left unconnected, or it may be connected to a controlled voltage source.

A three-phase DC motor is typically operated in a bipolar mode which can be summarized as follows. The three wye connected coils receive current in a sequence to drive the rotor. In each portion of the sequence a current path is established through two of the three coils. The third coil in the wye configuration is left floating, or, in other words, no current is permitted to flow through the third coil.

Current flow through the coils is controlled using the driving transistors. Current flows through a conducting high side driving transistor and its associated coil, through the center tap, and then through a second coil and its conducting low side driving transistor. The sequence of current paths is chosen so that, as the current path is changed, one of the coils in the current path is switched to a floating condition, and a previously floating coil is switched into the current path. In the wye configuration of three coils a total of six different current paths, called phases, are available to drive the rotor. The sequence is also chosen to ensure that when a previously floating coil is switched into the current path, the current flowing in the previously conducting coil will flow in the same direction in the newly conducting coil.

A commutation occurs each time the phase is changed and the position of the rotor at that moment is a commutation point. In the sequence of phases defined above, six different commutation events occur for each electrical cycle in the three-phase DC motor. One electrical cycle corresponds to one full rotation of the rotor.

When the rotor in the motor is rotating, the exact angular position of the rotor is typically ascertained by monitoring a back EMF signal, also called a BEMF signal, which is the EMF induced in the floating coil by the rotating magnetic field of the rotor. The BEMF signal in the floating coil is sinusoidal in nature, and crosses the voltage of the center tap at regular intervals. Conventionally, the commutation points are chosen in relation to the moments in which the BEMF signal crosses the center tap voltage, also called zero crossing points.

To ensure a smooth start-up, the position of the rotor must be known in order to correctly choose the coils for an initial phase. When the motor is starting from a rest position there is no BEMF signal from which the position of the rotor can be determined. Therefore, an alternative method of determining the position of the rotor prior to start-up of the motor is needed.

The choice of an initial phase to start the motor is important in determining the smoothness and speed of the start-up for several reasons. A slight backward rotation may occur in response to an initial current if the wrong start phase is selected. The back rotation may be relatively substantial if the initial phase is incorrect. The back rotation results in small oscillations in the motor which are acceptable in some systems but are undesirable in a high-speed disk drive system. An excessive back rotation may also damage read heads in the disk drive system. If the initial selected phase is too far forward, it moves the rotor in the forward direction, but the step forward between the rotor and the initial phase is so large that oscillations may result.

It is therefore desirable to know the exact position of the rotor prior to start-up to ensure a smooth and fast transition from at rest to full rotational speed. There are several conventional methods for starting a polyphase DC motor. In a method known as align and go, a selected phase is energized regardless of the position of the rotor. The rotor is pulled toward the selected phase and held there to provide a known starting position. The disadvantage of this approach is that the rotor oscillates about the phase for a short time period. The rotor is pulled in a forward rotational direction by driving selected phases once the oscillations have dissipated. The align and go method is electronically simple but may result in a significant back rotation of the rotor and the start-up time of the motor is increased. The align and go method also consumes a substantial amount of power.

An alternative method is an open loop phase stepping method in which the phases are sequentially energized in increments to pull the rotor in a forward direction. The time period between each commutation is large and is gradually reduced as the speed of the rotor increases. The disadvantages of the open loop phase stepping method include the possibility of a substantial back rotation, a long start-up time, and significant power dissipation. A third method for starting a DC motor is an inductive sense method in which the phases of the motor are coupled to a voltage source in a rapid sequence. A time period required for a current to reach a threshold in each phase is measured, and the shortest time period indicates a phase which is closest to the position of the rotor. A disadvantage of the inductive sense method is that a measurement of the time periods in increments of hundreds of nanoseconds is required to reliably detect the phase with the shortest time period. A high frequency clock is necessary to produce a clock signal in hundreds of nanoseconds and creates high frequency noise in a disk drive system which is highly undesirable.

SUMMARY OF THE INVENTION

According to principles of the present invention, a method for accurately detecting a position of a rotor while at rest, prior to start-up, is provided. The rotor is generally of the type used in a DC motor having a plurality of coils, and being operated in a plurality of phases. At rest, the rotor has a position relative to one of the phases. For each of a number of trials, a test is performed to determine which phase is located closest to the preferred start position of the rotor. Since the test being performed is not an exact measure, the test is repeated a number of times for each phase. Preferably, the test is performed an odd number of times. The phase which is determined to be closest to the start position of the rotor in the largest number of trials is identified as the phase being closest to the position of the rotor.

According to a preferred embodiment, the position of the rotor is determined in the following manner. For each of the six phases, a current is initiated in the phase and driven to rise towards a threshold. When the current reaches the threshold, it is terminated. The time taken for the current to rise to the threshold is measured for each phase. The identity of the phase having the shortest time period is stored. The shorter the time period, the closer that phase is to the correct starting phase position of the rotor. The measurements are repeated for an odd number of trials, and in each trial the identity of the phase having the shortest time period is stored. The phase identified in the majority of trials as having the shortest time period is selected as the phase closest to the rotor start position. According to one embodiment, this is the first phase to receive current to start the rotation of the rotor.

The use of multiple trials aids to ensure that the phase which is actually closest to the rotor starting position is consistently chosen as the phase closest to the position of the rotor. If a phase is incorrectly identified as the closest in a particular trial, the error will likely not be repeated over a majority of the trials. The use of multiple trials permits relatively large increments of time, such as microseconds, to be used to measure the time periods. A low threshold is selected so that the current in each phase does not reach a level that would induce movement in the rotor. The position of the rotor is therefore undisturbed as each phase receives current. After the current in a phase reaches the threshold and the time period is measured, the coils are all grounded to dissipate current in the coils to ensure that the rotor never moves during the sensing phase.

The method provides for consistent and reliable startups of the DC motor. The method also minimizes back rotation and reduces the time required to start the motor. The method also results in a generation of a high BEMF signal early in the start-up rotation for a detection of a first zero crossing point.

DETAILED DESCRIPTION OF THE INVENTION

Figure 2:
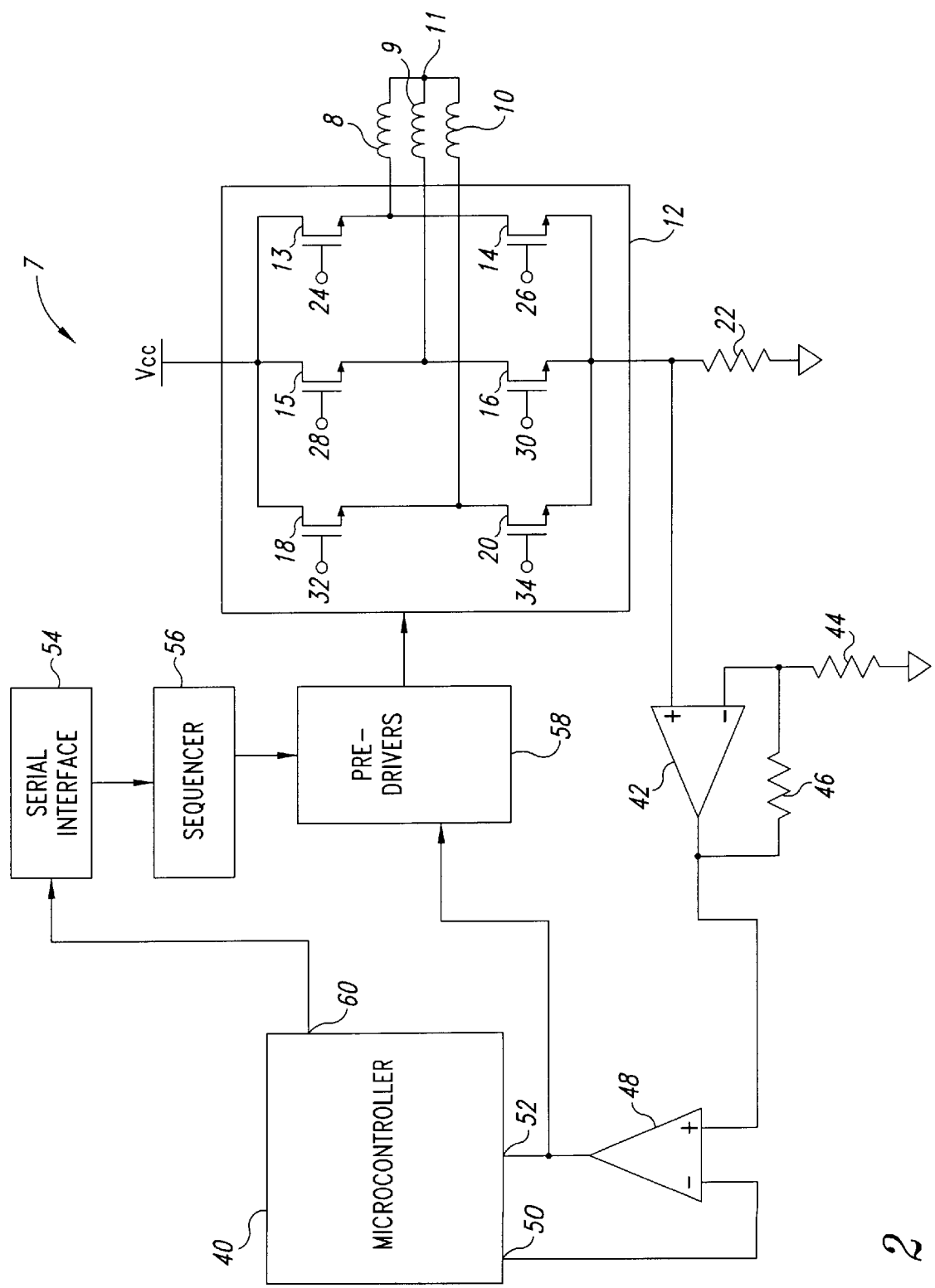
FIG. 2 is an electrical schematic diagram of a control circuit for a three-phase DC motor.
Figure 3A:
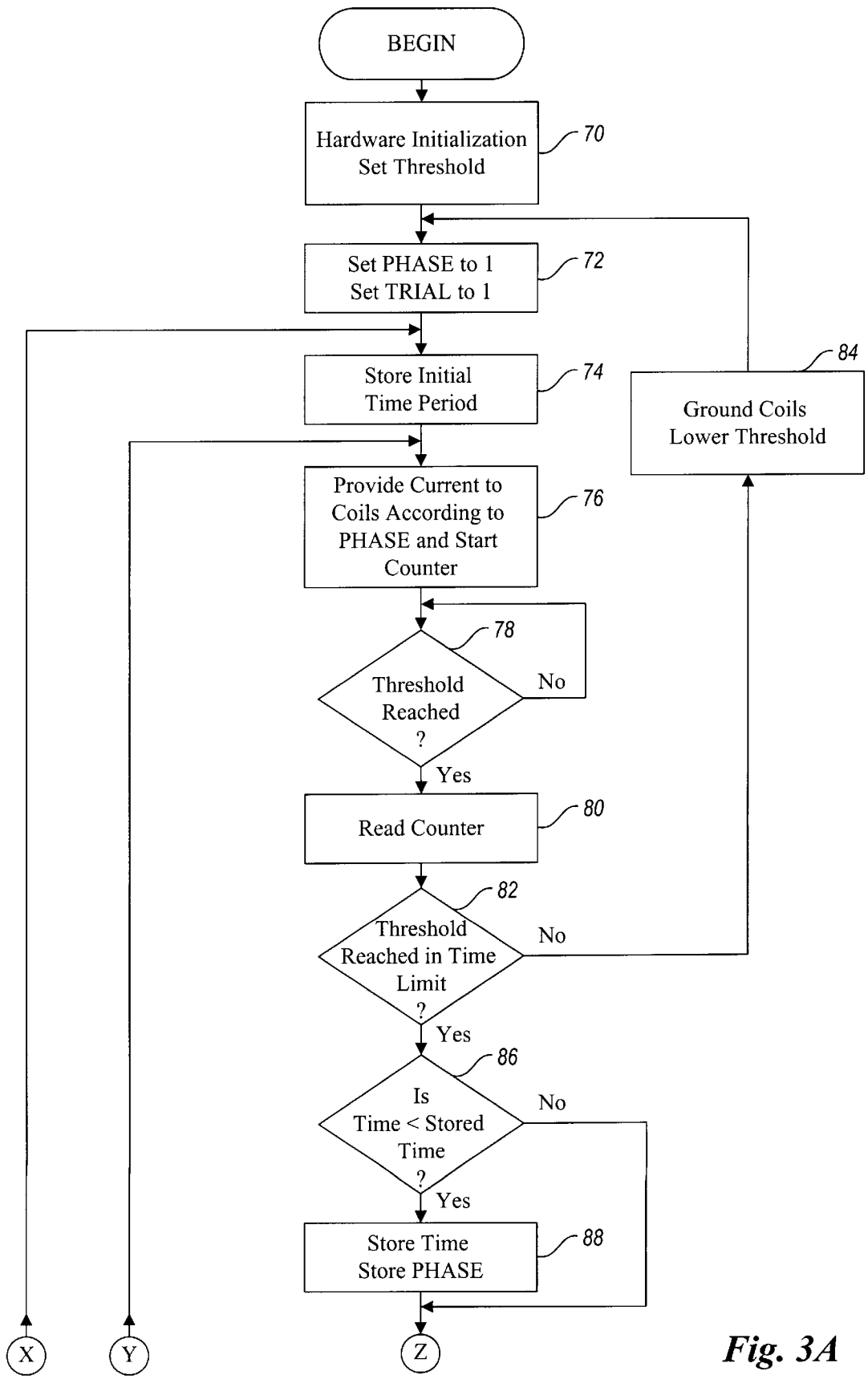
FIG. 3A is a top portion of a flowchart of a software routine carried out by the control circuit shown in FIG. 2 for starting a polyphase DC motor according to an embodiment of the invention.
Figure 3B:
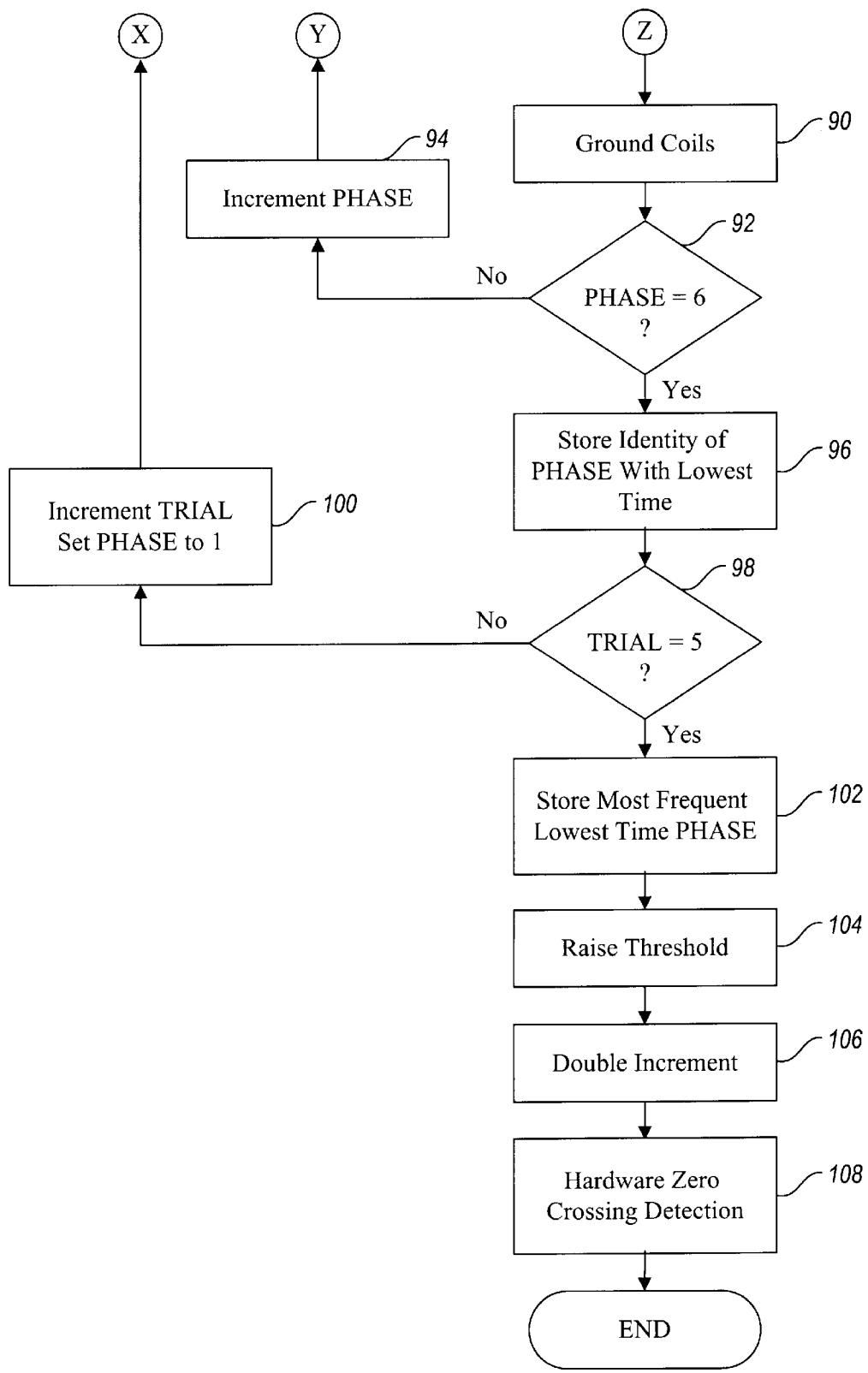
FIG. 3B is a bottom portion of the flowchart illustrated in FIG. 3A.

The method according to the embodiment of the invention may be carried out by a control circuit 7 shown in FIG. 2 according to a software routine represented by a flowchart shown in FIGS. 3A and 3B. Three symbols with the letters X, Y, and Z therein indicate logical connections between the FIGS. 3A and 3B.

The circuit for causing rotation of rotor 1 will first be described, after which the method of determining the correct starting phase will be described according to principles of the present invention.

Figure 1:
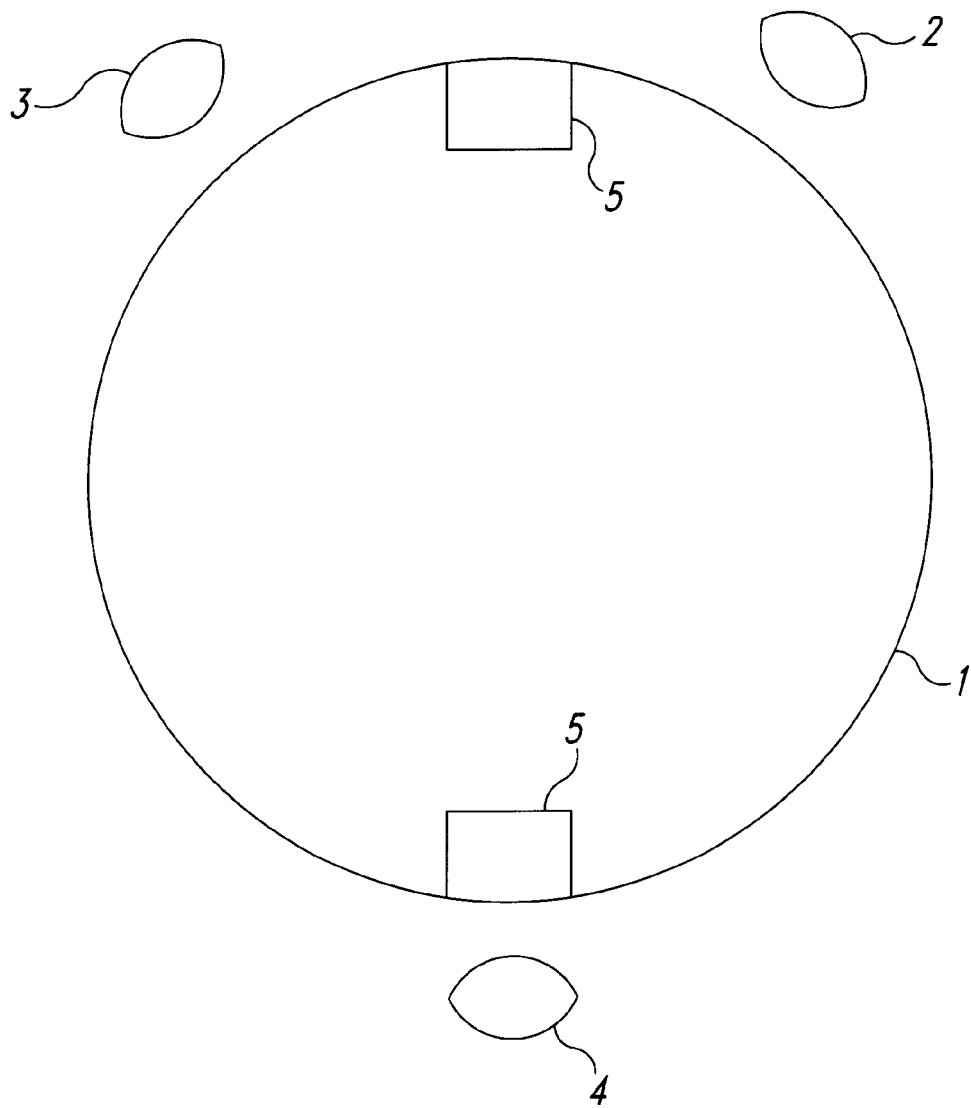
FIG. 1 is a schematic diagram of a three-phase DC motor according to the prior art.

A control circuit 7 for a wye connected three-phase DC motor is shown schematically in FIG. 2. Three coils 8, 9, and 10 are connected together at a center tap 11. The center tap 11 is floating, or in other words, it is not driven by any source including a voltage source. The coils 8, 9, and 10 are positioned on a stator which surrounds a rotor in a manner similar to that shown in FIG. 1, such rotor and coil assemblies being well known.

Each of the coils 8, 9, and 10 is driven by a pair of n-channel MOS driving transistors; an end of each of the coils 8, 9, and 10 is connected between a high side driving transistor and a low side driving transistor in a power stage 12. An end of the coil 8 is connected to a source of a high side driving transistor 13 and to a drain of a low side driving transistor 14. An end of the coil 9 is similarly connected to a source of a high side driving transistor 15 and to a drain of a low side driving transistor 16. An end of the coil 10 is connected to a source of a high side driving transistor 18 and to a drain of a low side driving transistor 20. Each of the high side driving transistors 13, 15, and 18 has a drain coupled to a voltage source $V_{CC}$, and each of the low side driving transistors 14, 16, and 20 has a source connected to a first end of a sense resistor 22. A second end of the sense resistor 22 is coupled to a ground. The connection of the sense resistor 22 to the sources of each of the low side driving transistors 14, 16, and 20 ensures that current flowing through the coils 8, 9, and 10 will pass through the sense resistor 22 before returning to the ground. A voltage drop across the sense resistor 22 is a measure of the current in the coils 8, 9, and 10.

Each of the high side and low side driving transistors 13, 14, 15, 16, 18, and 20 in the power stage 12 has a gate which is driven by one of a set of control signals 24, 26, 28, 30, 32, and 34. The gate of the high side driving transistor 13 is driven by the control signal 24. The gate of the low side driving transistor 14 is driven by the control signal 26. The gate of the high side driving transistor 15 is driven by the control signal 28, and the gate of the low side driving transistor 16 is driven by the control signal 30. The gate of the high side driving transistor 18 is driven by the control signal 32, and the gate of the low side driving transistor 20 is driven by the control signal 34. The gates of the high side and low side driving transistors 13, 14, 15, 16, 18, and 20 are selectively provided with a high voltage by the control signals 24, 26, 28, 30, 32, and 34, respectively, to control current in the coils 8, 9, and 10. When a gate of one of the driving transistors is provided with a high voltage control signal, the driving transistor is rendered conductive and becomes part of a current path in the motor. Conversely, when a gate of one of the driving transistors is provided with a low voltage control signal it is rendered non-conductive and is no longer part of the current path. For example, in a representative phase current flows from the voltage source $V_{CC}$ through the high side driving transistor 13, the coil 8, the center tap 11, the coil 9, and then through the low side driving transistor 16 and the sense resistor 22 to the ground. This particular phase is chosen by providing the control signals 24 and 30 at a high voltage to render the driving transistors 13 and 16 conductive while providing the other four control signals 26, 28, 32, and 34 at a low voltage. A commutation is carried out by pulling one of the high voltage control signals to a low voltage and simultaneously driving one of the low voltage control signals to a high voltage.

The operation of the three-phase DC motor is controlled by a microcontroller 40. The microcontroller 40 governs the motion of the rotor, the selection of phases, and a startup operation for the motor.

The rotor rotates at a speed proportional to the driving current in the coils 8, 9, and 10 which is determined from the voltage drop across the sense resistor 22. The first end of the sense resistor 22 is connected to a non-inverting input of an operational amplifier 42. A resistor 44 is connected between an inverting input of the operational amplifier 42 and the ground, and a resistor 46 is connected between the inverting input and an output of the operational amplifier 42. The output of the operational amplifier 42 is connected to a non-inverting input of a comparator 48. The microcontroller 40 provides a speed control signal from a port 50 to an inverting input of the comparator 48, and an output of the comparator 48 is connected to a port 52 of the microcontroller 40. A voltage from the first end of the sense resistor 22 is amplified by a combination of the operational amplifier 42 and the resistors 44 and 46, and the amplified voltage is applied to the non-inverting input of the comparator 48. The amplified voltage is compared with the speed control signal by the comparator 48 and an output of the comparator 48 is provided to the port 52 which transitions from a low voltage to a high voltage when the speed of the rotor exceeds the speed indicated by the speed control signal.

The microcontroller 40 controls the driving current in the coils 8, 9, and 10 through a serial interface 54, a sequencer 56, and a pre-driver circuit 58. The microcontroller 40 provides data to the serial interface 54 from a port 60, and the serial interface 54 generates a signal based on the data and provides the signal to the sequencer 56. The sequencer 56 contains a set of 8 bit registers, each register holding information to direct the pre-driver circuit 58 to render the driving transistors 13, 14, 15, 16, 18, and 20 either conductive or non-conductive. At least six of the registers in the sequencer 56 contain information for selecting each of the six phases, respectively, and additional registers contain information to put the coils 8, 9, and 10 into various states. For example, one of the registers contains information to render all of the driving transistors 13, 14, 15, 16, 18, and 20 non-conductive to tri-state the coils 8, 9, and 10. Another register contains information to render the high side driving transistors 13, 15, and 18 non-conductive and the low side driving transistors 14, 16, and 20 conductive to couple the coils 8, 9, and 10 to the ground through the sense resistor 22 to brake the rotor. The signal generated by the serial interface 54 is provided to select a register in the sequencer 56 which provides the information in the selected register to the pre-driver circuit 58. The pre-driver circuit 58 generates the control signals 24, 26, 28, 30, 32, and 34 based on the information in the selected register. The control signals 24, 26, 28, 30, 32, and 34 are provided to the power stage 12 and the driving transistors 13, 14, 15, 16, 18, and 20 to control current in the coils 8, 9, and 10.

In an alternative embodiment of the invention the sequencer 56 is made up of a ring of six flip-flops, each flip-flop corresponding to one of the driving transistors 13, 14, 15, 16, 18, or 20.

The output of the comparator 48 is connected to an enabling input of the pre-driver circuit 58. The pre-driver circuit 58 is enabled to provide the control signals 24, 26, 28, 30, 32, and 34 when the output of the comparator is at a low voltage. When the speed of the rotor exceeds the speed indicated by the speed control signal the output of the comparator 48 transitions to a high voltage which disables the pre-driver circuit 58. The disabled pre-driver circuit 58 renders all the driving transistors 13, 14, 15, 16, 18, and 20 non-conductive to tri-state the coils 8, 9, and 10. The current in the tri-stated coils 8, 9, and 10 dissipates which lowers the voltage on the first end of the sense resistor 22 causing the output of the comparator 48 to return to a low voltage. After the current has dissipated, the pre-driver circuit 58 is enabled to provide the control signals 24, 26, 28, 30, 32, and 34.

The three-phase DC motor may be operated in a bipolar mode in which the coils 8, 9, and 10 receive current according to a sequence of phases, each phase being defined by a current path through two of the three coils while the third coil is left floating. A first phase has been described above in which the driving transistors 13 and 16 are rendered conductive to induce a current path through the coils 8 and 9. Six alternate phases are available for the wye configuration of coils, and the six phases are selected at commutation points in a sequence to start and maintain a rotation of the rotor. The sequence of phases is arranged so that, as each commutation occurs, one of the coils in the current path is switched to a floating condition, and the previously floating coil is switched into the current path. Moreover, the sequence is chosen such that when the floating coil is switched into the current path, it replaces one of the conducting coils such that current flows in the newly conducting coil in the same direction as it had in the formerly conducting coil. For example, if current is flowing through the high side driving transistor 13 to the coil 8, and the coil 8 is replaced by the coil 9, current will then flow from the high side driving transistor 15 to the coil 9.

One full rotation of the rotor represents a complete electrical cycle in which the rotor is driven by the entire sequence of six phases. The six phases are shown in Table A:

TABLE A

| Phase | Current Flows From Coil: | To Coil: | Floating Coil |
| --- | --- | --- | --- |
| 1 | 8 | 9 | 10 |
| 2 | 8 | 10 | 9 |
| 3 | 9 | 10 | 8 |
| 4 | 9 | 8 | 10 |
| 5 | 10 | 8 | 9 |
| 6 | 10 | 9 | 8 |

In phase 1, current flows from the coil 8 to the coil 9 and the coil 10 is floating. In phase 2, current flows from the coil 8 to the coil 10 and the coil 9 is floating. The current flowing through the coil 8 in phase 1 is also flowing in the coil 8 in phase 2, whereas the floating coil has been switched from the coil 10 to the coil 9. The rest of the phases follow similarly according to table A.

When the rotation of the three-phase DC motor is being terminated, the rotor is brought to a rest position in a braking operation. The rotor is braked in the following manner. The control signals 24, 28, and 32 are pulled to a low voltage by the pre-driver circuit 58 to render the high side driving transistors 13, 15, and 18 non-conductive to isolate the coils 8, 9, and 10 from the voltage source $V_{CC}$. The pre-driver circuit 58 also provides the control signals 26, 30, and 34 at a high voltage to render the low side driving transistors 14, 16, and 20 conductive to couple each of the coils 8, 9, and 10 to the ground through the sense resistor 22. The rest position of the rotor after the braking operation is unknown, but the rotor has a natural tendency to come to rest close to one of the phases.

A number of methods for operating three-phase DC motors are well known, and several examples are contained in U.S. Pat. Nos. 5,221,881; 5,294,877; 5,306,988; and 5,317,243 which are incorporated herein by reference. In an alternative embodiment, the three-phase DC motor may be operated with a sequence of three phases rather than six phases.

Referring jointly to FIGS. 2, 3A and 3B, for describing the invention, according to the software routine the microcontroller 40 initializes hardware in the control circuit 7 in step 70 by setting voltage references and bias currents. The microcontroller 40 also outputs a threshold voltage level from the port 50. The threshold voltage is provided as an input to a comparator 48; the other input to comparator 48 is from the voltage on the current sense resistor 22 provided via amplifier 42. The output of the comparator 48 transitions from a low voltage to a high voltage when current in a selected phase exceeds the threshold set by the microcontroller 40. As described above, the threshold is selected to be low enough to not cause movement in the rotor when each phase is provided with current.

The microcontroller 40 sets a PHASE variable to one and sets a TRIAL variable to one in step 72. The PHASE variable indicates which phase is to be provided with current. The TRIAL variable indicates which trial is being carried out. The microcontroller 40 stores an initial time period in a memory in step 74. Alternatively, the microcomputer can store nothing in the memory at this stage and then store the first, measured time period as the initial time period. The stored time period is compared with a time period measured in a succeeding step.

The microcontroller 40 then carries out a series of steps 76–98 for each trial to determine which phase is located closest to the proper start position of the rotor. According to step 76 the microcontroller 40 selects a phase corresponding to the PHASE variable and provides data to the serial interface 54 from the port 60 to direct the sequencer 56 and the pre-driver circuit 58 to initiate current in the selected phase. The microcontroller 40 also starts a counter in step 76. According to step 78 the microcontroller 40 monitors the output of the comparator 48, which is provided to the port 52, until the output of the comparator 48 transitions to a high voltage when the current in the selected phase exceeds the threshold. As described elsewhere herein, the pre-driver circuit 58 is disabled when the output of the comparator 48 transitions to a high voltage such that the coils 8, 9, and 10 are tri-stated. The microcontroller 40 reads the counter in step 80 after the threshold is exceeded and determines an elapsed time between the start of current in the selected phase and the moment the current exceeded the threshold. The microcontroller 40 decides in step 82 if the current exceeded the threshold within a maximum time limit.

If the current did not exceed the threshold within the maximum time limit, then the threshold is too high and an excessive amount of current was drawn by the coils 8, 9, and 10. The microcontroller 40 reduces the threshold and brakes the rotor by grounding the coils 8, 9, and 10 in step 84. The testing sequence is again conducted, returning to step 72.

In one embodiment, the step of braking is not performed. The step of braking the rotor may take a substantial amount of time and is not necessary to the performance of the method, according to one embodiment. A sufficient amount of current is dissipated when the coils 8, 9, and 10 are tri-stated by the pre-driver circuit 58 after the threshold is reached in step 78. The microcontroller 40 returns to step 72 to set the PHASE and TRIAL variables to one and repeats the steps 74 to 82. The maximum time limit within which the threshold is to be reached and the value of the threshold are chosen such that the current in the selected phase never induces movement in the rotor. If the threshold is not reached within a selected time period, the threshold is reduced and the test repeated. This continues until it is a value that the current reaches the threshold within the time limit. In one embodiment of the invention, the maximum time limit is selected to be 1 millisecond.

If the current provided to the selected phase reaches the threshold within the maximum time limit then the microcontroller 40 compares the time period determined by reading the counter in step 80 with a stored time period. The stored time period may either be the initial time period stored in step 74 or a time period stored for a previous phase. The microcontroller 40 decides in step 86 whether the time period for the selected phase is less than the stored time period in which case the time period for the selected phase is stored in the memory and the stored time period is discarded in step 88. The PHASE variable is also stored in the memory by the microcontroller 40 in step 88. If the time period for the selected phase is greater than or equal to the stored time period, then the stored time period is retained by the microcontroller 40 and the time period for the selected phase is discarded. According to step 90 the microcontroller 40 brakes the rotor. Again, the braking procedure is not necessary for the performance of the method according to the invention.

The microcontroller 40 decides in step 92 whether the PHASE variable has reached the number six indicating that a time period has been measured for each of the six phases. If the PHASE variable is less than six, the microcontroller 40 increments the PHASE variable by one in step 94 and returns to step 76 to provide current to the phase identified by the incremented PHASE variable and to restart the counter. The microcontroller 40 then proceeds to complete steps 78–84 for the phase identified by the incremented PHASE variable. In step 86, the microcontroller 40 compares the most recently measured time period with the stored time period. If the most recently measured time period is the shorter of the two, it is stored in the memory along with the PHASE variable in step 88, and the microcontroller 40 brakes the motor in step 90.

Once the PHASE variable has reached the number six indicating that a time period has been measured for each of the six phases in a particular trial identified by the TRIAL variable, the microcontroller 40 retrieves the PHASE variable stored in the memory which indicates the phase identified to be closest to the position of the rotor in the trial and retains the identity of the PHASE variable in a different location in the memory in step 96. According to step 98, the microcontroller 40 decides whether the TRIAL variable has reached the number five. If the TRIAL variable is less than five, then the microcontroller 40 increments the TRIAL variable by one and sets the PHASE variable to one in step 100, and returns to step 74 to store an initial time period in the memory. The memory can be any acceptable memory including on board RAM, registers, dish drivers, etc. The microcontroller 40 then repeats steps 76–98 for the new trial.

In the embodiment of the invention shown in FIGS. 3A and 3B, a total of five trials are implemented. The total number of trials may be any odd number and the probability of an erroneous selection of the starting phase decreases as the number of trials is increased. However, each additional trial lengthens the period of time required to start the motor. The selection of five trials maximizes the accuracy of the method while minimizing the amount of time needed to sense the position of the rotor. In one embodiment only 1 or 3 trials are used while in other embodiments, 7 or more trials are used. According to a further embodiment, an even number of trials can be carried out, while this presents the possibility of a tie between two phases, with any one of many tie breaker schemes, the starting phase can be selected.

When five trials have been run the TRIAL variable will have a value of five and the identities of five phases, each selected as being closest to the position of the rotor in one of the trials, are stored in the memory. The most frequently selected phase is stored in the memory by the microcontroller 40 in step 102 as being the phase closest to the position of the rotor.

According to a first embodiment, the motor is then started according to the following steps. The microcontroller 40 raises the threshold to an operating level in step 104 and thus increases the value of the speed control signal provided from the port 50 to permit enough current in the coils to induce the rotor to rotate at a desired speed. The microcontroller 40 carries out a double increment starting procedure in step 106 in which the starting phase selected in step 102 is provided with current and, at a succeeding commutation point, a second phase ahead of the starting phase is provided with current. In one embodiment, the phase immediately in front of the starting phase is skipped in favor of the second phase to perform what is known as a double increment starting procedure, which is known in the art. The rotor begins to rotate in a forward direction and a BEMF signal is generated in the floating coil. A first zero crossing is detected by the microcontroller 40 in step 108 which operates the motor in a bipolar mode thereafter.

According to one embodiment, the location of the rotor is determined just prior to start-up, upon the microcontroller 40 receiving a start-up command from an outside input or from internal software.

According to a second embodiment of the invention, the method of determining the rotor position is carried out at the end of a rotation period, after the rotor has stopped and while it is waiting for the next start signal. In particular, as is known, a rotor in a hard disk drive may spin initially for a few minutes at computer start-up. When the reading of data from the hard disk drive is completed, the disk drive motor is shut down and rotation is stopped, even though the computer is still operating. This frequently happens in a power saving mode or in other modes of operation. Even though the rotor is now stationary, the computer is on and it is anticipated that the disk drive will be used in the near future. Starting the rotor into rotation will be needed at that time. According to the invention, the position of the rotor and desired starting phase are determined while the rotor is at rest, before the starting signal is provided. This may take place immediately after the rotor has come to a rest or some moments later, after lapse of a selected time but before the start-up signal is generated. Since time is not critical during this rest period, the trials for determining the start phase can be carried out over a relatively long time period or using numerous trials, if desired. The number of trials may, for example, be 15 or 25 or higher. A standard statistical analysis can be carried out to select the closest phase to the starting position. Enough trials can be carried out to be more certain of the exact rotor position. This phase is then stored and the rotor is held in a braked position such that the rotor does not move. When a start-up signal comes, either from outside or from a program software, such as stored in the microcontroller 40, the program checks the memory to determine the position of the rotor and hence the proper starting phase. The first current sent to the coils will be starting rotational current to the proper phase. Rotation will begin immediately, with no testing at this time since the proper start-up phase has been previously identified and stored. A very fast start-up is thus possible with the proper phase. On start-up, the rotor will not have backward rotation or oscillation since the proper first phase has been previously stored and the rotor has been stationary since the last measurement.

According to a still further embodiment, if the software can anticipate a start-up signal, such as may be carried out under software timing control, the testing may be carried out close to, and prior to the startup signal to save time but still be assured the rotor starts in the proper first phase.

The testing to determine the rotor position can occur at a time that is convenient for the microcontroller 40, such as when it is idle or other time before start-up.

In one embodiment the testing is performed using many trials after the braking is completed. Once the signal to start is given, a single check trial can be made by testing each phase one time. The shortest phase can be identified. If this phase is the same as the stored phase, there is good assurance that the rotor has, in fact, been stationary and start-up can commence. This is also a fast start-up routine. If a different phase is identified as being the closest in this single trial, then the full test of checking each phase in multiple trials can be commenced, as previously described.

Figure 4:
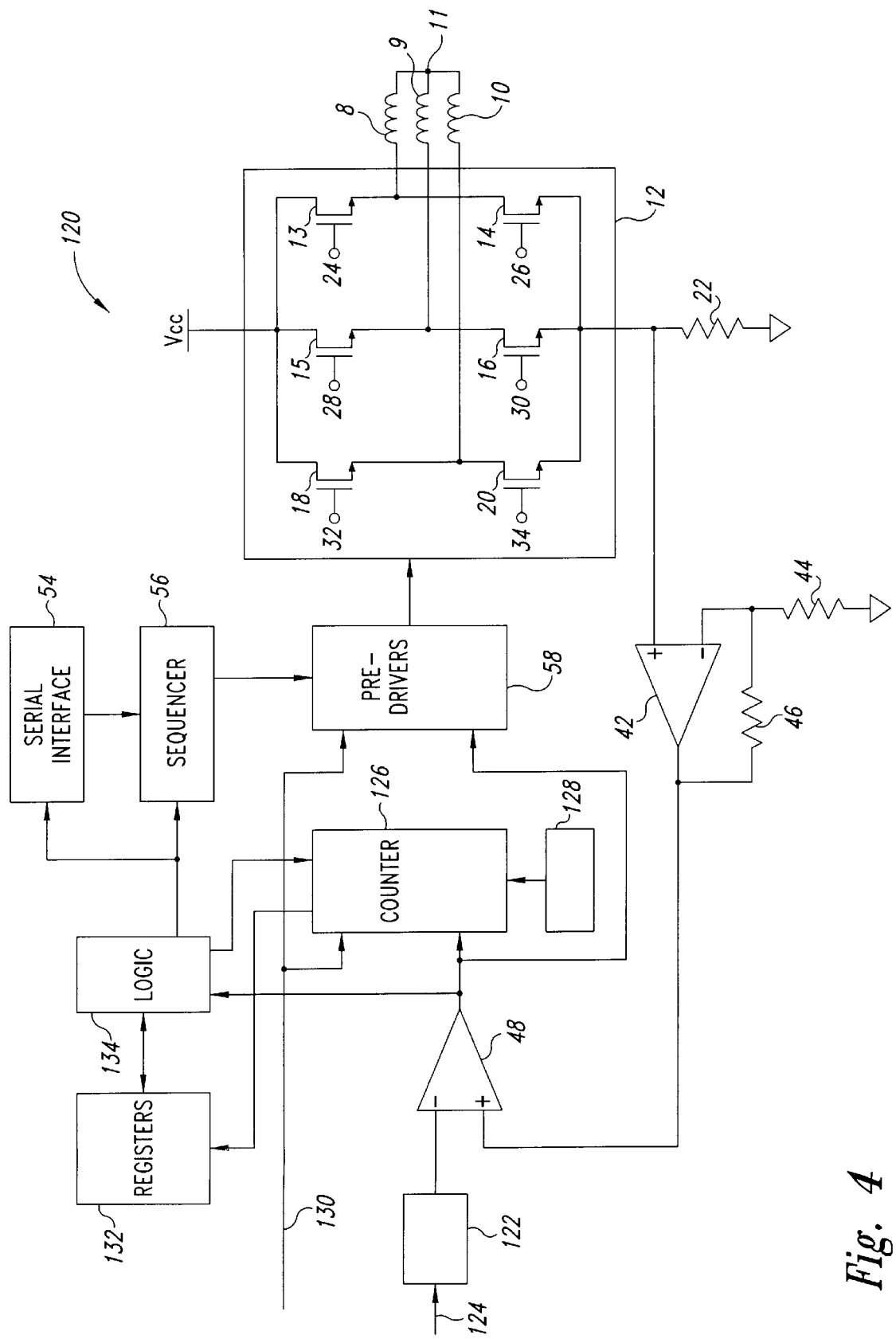
FIG. 4 is an electrical schematic diagram of a control circuit for a three-phase DC motor according to an embodiment of the invention.

A control circuit 120 for a wye-connected three-phase DC motor according to an alternative embodiment of the invention is shown in FIG. 4. The control circuit 120 shown in FIG. 4 includes several elements which are similar to corresponding elements in the control circuit 7 shown in FIG. 2, and elements common to both control circuits 7 and 120 have the same reference numerals.

Three coils 8, 9, and 10 are connected together at a center tap 11 and receive current from a power stage 12. An end of the coil 8 is connected to a source of a high side driving transistor 13 and to a drain of a low side driving transistor 14. An end of the coil 9 is connected to a source of a high side driving transistor 15 and a drain of a low side driving transistor 16. An end of the coil 10 is connected to a source of a high side driving transistor 18 and a drain of a low side driving transistor 20. Each of the driving transistors 13, 14, 15, 16, 18, and 20 has a gate, a drain, and a source. The drains of the high side driving transistors 13, 15, and 18 are connected to a voltage source $V_{CC}$ and the sources of each of the low side driving transistors 14, 16, and 20 are connected to a first end of a sense resistor 22. A second end of the sense resistor 22 is coupled to a ground. Each of the driving transistors 13, 14, 15, 16, 18, and 20 is controlled by a respective one of a plurality of control signals 24, 26, 28, 30, 32, and 34.

The first end of the sense resistor 22 is connected to a non-inverting input of an operational amplifier 42. An inverting input of the operational amplifier 42 is connected to a first end of a resistor 44 and to a first end of a resistor 46. A second end of the resistor 44 is connected to the ground, and a second end of the resistor 46 is connected to an output of the operational amplifier 42. The output of the operational amplifier 42 is connected to a non-inverting input of a comparator 48.

The control circuit 120 includes a serial interface 54, a sequencer 56, and a pre-driver circuit 58. The sequencer 56 includes a set of 8 bit registers, each register holding information to direct the pre-driver circuit 58 to render the driving transistors 13, 14, 15, 16, 18, and 20 either conductive or non-conductive in a manner similar to the sequencer 56 described with respect to the control circuit 7. A register in the sequencer 56 is selected and its information is provided to the pre-driver circuit 58 which converts the information to the control signals 24, 26, 28, 30, 32, and 34 which the pre-driver circuit 58 provides to the driving transistors 13, 14, 15, 16, 18, and 20. The control signals 24, 26, 28, 30, 32, and 34 direct which of the driving transistors 13, 14, 15, 16, 18, and 20 are to be rendered conductive or non-conductive to control current in the coils 8, 9, and 10 in the same manner as described with respect to the control circuit 7 shown in FIG. 2.

In an alternative embodiment of the invention the sequencer 56 is made up of a ring of six flip-flops, each flip-flop corresponding to one of the driving transistors 13, 14, 15, 16, 18, or 20.

The control circuit 120 further includes several hardware elements which implement the steps of the software routine shown in FIGS. 3A and 3B. A microcontroller (not shown) provides a signal to a programmable block 122 on a line 124, and the programmable block 122 generates a speed control signal based on the signal from the microprocessor which is provided to an inverting input of the comparator 48. A counter 126 is connected to receive an output of the comparator 48. The counter 126 is enabled when the output of the comparator 48 is at a low voltage, and is disabled when the output of the comparator 48 transitions to a high voltage. The counter 126 receives a clock signal from a clock 128. The output of the comparator 48 is also provided to the pre-driver circuit 58 which is enabled when the output of the comparator 48 is at a low voltage. When the output of the comparator 48 transitions to a high voltage the pre-driver circuit 58 is disabled and each of the driving transistors 13, 14, 15, 16, 18, and 20 is rendered non-conductive such that the coils 8, 9, and 10 are tri-stated. As the output of the comparator 48 transitions to a low voltage, the pre-driver circuit 58 is enabled to provide the control signals 24, 26, 28, 30, 32, and 34.

Both the counter 126 and the pre-driver circuit 58 receive a start signal generated by the microcontroller on a line 130. The start signal directs the control circuit 120 to start driving the rotor to rotate. The counter 126 includes an output connected to a block of memory registers 132 which receive a count generated by the counter 126 such that the count may be accessed by a logic circuit 134 which communicates with the registers 132. The registers 132 also include additional memory registers available for use by the logic circuit 134.

The logic circuit 134 is connected to receive the output of the comparator 48, and has an output connected to the counter 126 to direct the counter 126 to start counting. The logic circuit 134 also has an output coupled to provide a signal to the sequencer 56 and the serial interface 54. The logic circuit 134 provides the signal to the sequencer 56 to select a register in the sequencer 56 which contains information that is provided to the pre-driver circuit 58. The signal from the logic circuit 134 is also provided to the serial interface 54 such that it may be accessed by the microcontroller.

The control circuit 120 implements the software routine shown in FIGS. 3A and 3B in the following manner. The microcontroller provides the start signal on the line 130 to indicate to the control circuit 120 that the rotor is to be started. In response to the start signal the logic circuit 134 initializes the hardware by setting appropriate voltage references and bias currents in the control circuit 120 according to step 70. The logic circuit 134 also selects a threshold in step 70, and then sets a PHASE variable to one and a TRIAL variable to one in step 172. According to step 74, the logic circuit 134 stores an initial time period. In step 76, the logic circuit 134 directs the pre-driver circuit 58 through the sequencer 56 to generate the control signals 24, 26, 28, 30, 32, and 34 to provide current to the coils 8, 9, and 10 in a phase selected according to the PHASE variable. The logic circuit 134 also starts the counter 126 in the step 76. Current increases in the selected phase until a voltage at the first end of the sense resistor 22 reaches a level such that the output of the amplifier 42 is greater than the speed control signal which causes the output of the comparator 48 to transition from a low voltage to a high voltage. At this point the counter 126 is disabled and the count provided to the registers 132 corresponds to a time period between the start of current in the selected phase and the point when the current in the selected phase reached the threshold. The transition from a low voltage to a high voltage at the output of the comparator 48 also disables the pre-driver circuit 58 which renders the driving transistors 13, 14, 15, 16, 18, and 20 non-conductive to tri-state the coils 8, 9, and 10. As a result, current in the coils 8, 9, and 10 dissipates.

According to steps 78 and 80, the logic circuit 134 receives the output of the comparator 48 and reads the count provided to the registers 132 by the counter 126 when the output of the comparator 48 transitions from a low voltage to a high voltage.

According to step 82, the logic circuit 134 compares the time period indicated by the count in the registers 132 with a maximum time limit. If the time period exceeds the maximum time limit then the logic circuit 134 lowers the threshold in step 84, and sends a signal to the sequencer 56 to select a register that directs the pre-driver circuit 58 to brake the motor. Again, as described above, the step of braking the motor is not necessary according to the invention. The logic circuit 134 then sets the PHASE variable to one and the TRIAL variable to one according to step 72 and repeats the steps 74–82 with the lower threshold.

If the current provided to the selected phase reaches the threshold within the maximum time limit then the logic circuit 134 compares the time period for the selected phase with the stored time period located in the registers 132 in step 86. The stored time period may either be the initial time period stored in step 74 or a time period stored for a previous phase. The logic circuit 134 decides in step 86 whether the time period for the selected phase is less than the stored time period in which case the time period for the selected phase and the PHASE variable are stored in the registers 132 and the stored time period is discarded in step 88. If the logic circuit 134 decides that the time period is greater than or equal to the stored time period then the stored time period is retained in the registers 132. The logic circuit 134 then provides a signal to the sequencer 56 to select a register containing information directing the pre-driver circuit 58 to brake the rotor in step 90. As described above, the step of braking the rotor is not necessary to the performance of the method.

The logic circuit 134 decides in step 92 whether the PHASE variable has reached the number six indicating that a time period has been measured for each of the six phases. If the PHASE variable is less than six, the logic circuit 134 increments the PHASE variable by one in step 94 and returns to step 76 to direct the sequencer 56 and the pre-driver circuit 58 to provide current to a phase based on the incremented PHASE variable and to restart the counter. The logic circuit 134 then proceeds to complete steps 78–84 for the phase identified by the incremented PHASE variable. In step 86, the logic circuit 134 compares a most recently measured time period with the stored time period in the registers 132. If the most recently measured time period is the shorter of the two, it is stored in the registers 132 along with the PHASE variable in step 88, and the logic circuit 134 provides a signal to brake the rotor in step 90.

Once the PHASE variable has reached the number six the logic circuit 134 retrieves the PHASE variable stored in the registers which indicates the phase identified to be closest to the position of the rotor in the trial identified by the TRIAL variable and retains the PHASE variable in a different location in the registers 132 according to step 96. The logic circuit 134 then decides whether the TRIAL variable has reached the number five in step 98. If the TRIAL variable is less than five, the logic circuit 134 increments the TRIAL variable by one and sets the PHASE variable to one in step 100, and returns to step 74 to store an initial time period in the registers 132. The logic circuit 134 then repeats steps 76–98 for a new trial based on the incremented TRIAL variable.

When the TRIAL variable reaches a value of five then the identities of five phases, each selected as being closest to the position of the rotor in one of the trials, are stored in the registers 132. According to step 102, the most frequently selected phase is stored in a new location in the registers 132 by the logic circuit 134 as being the phase closest to the position of the rotor. The logic circuit 134 then provides a signal to the sequencer 56 selecting a register in the sequencer corresponding to the phase selected as being closest to the position of the rotor, and the information in the selected register is provided to the pre-driver circuit 58. The microcontroller then assumes control to start the rotation of the rotor. The microcontroller terminates the start signal provided on the line 130 and, according to step 104, raises the signal provided on the line 124 to raise the speed control signal generated by the programmable block 122 to permit enough current in the coil to induce rotation in the rotor. The microcontroller then provides a signal to the serial interface 54 to induce the sequencer 56 and the pre-driver circuit 58 to direct current to the coils based on the register selected by the logic circuit 134. Current is then provided to the phase selected as being closest to the position of the rotor. According to step 106, at a subsequent commutation point the microcontroller performs a double increment by providing a signal to the serial interface 54 such that current is supplied to a second phase ahead of the phase closest to the position of the rotor. The microcontroller then controls the rotation of the rotor in a bipolar mode.

Of course, many components in the circuit of FIG. 4 could be in hardware or software. The logic, clock, registers, and even counter could be in either software or hardware.

The method according to the embodiments of the invention described above provides several advantages over known methods of starting a polyphase DC motor. The use of multiple trials to establish a rest position of the rotor ensures that the position of the rotor will be determined accurately before the motor is started. A double increment may therefore be applied in a correct direction to start the motor. The method reduces the amount of time needed to start the motor by minimizing the occurrence of back rotation and oscillations. The minimal back rotation and oscillation during the start-up ensures that a high BEMF signal will be available at a first zero crossing for detection.

The method according to the embodiments of the invention is an improvement over the known inductive sense method because it permits the use of a low frequency clock to produce clock signals for the measurement of the time periods. The elimination of a high frequency clock reduces the amount of high frequency noise in a disk drive system employing the method which may interfere with a transfer of data to or from a magnetic storage medium. The method may be employed based on a one megahertz clock signal providing a resolution of the time periods in microseconds. The precision of the method may be improved by increasing the resolution of the measurement of the time periods. For example, a clock signal of two megahertz providing a resolution of half microseconds would double the accuracy of the method.

A method and a circuit for starting a polyphase DC motor has been described. In some instances, well-known circuits such as a microcontroller and other circuitry for operating a three-phase DC motor such as circuitry for detecting back-emf zero crossings have not been shown in detail in order not to unnecessarily obscure the invention. In addition, it will be appreciated that, although various embodiments of the invention have been described above for purposes of illustration, various modifications may be made without deviating from the spirit and scope of the invention. For example, the present invention has been described as being applied to a three-phase DC motor. However, those skilled in the art will appreciate that the present invention could be applied to a polyphase DC motor having any number of phases. Also, the present invention has been described in relation to a three-phase DC motor being operated in a bipolar mode with a sequence of six phases. The present invention is equally applicable to a three-phase DC motor being operated in a unipolar or tripolar mode. Numerous variations are well within the scope of this invention. Accordingly, the invention is not limited except as by the appended claims.

What is claimed is:

1. A method for starting a DC motor, the DC motor having a rotor and a plurality of coils and being operated in a plurality of phases, the rotor having a position relative to one of the phases, the method comprising:

for each of an odd number of trials:
    for each of the plurality of phases:
        introducing a current into the phase;
        measuring a time period between the introduction of the current into the phase and an instant when the current in the phase exceeds a predetermined threshold;
        terminating the current in the phase;
    identifying a phase having a shortest time period;
selecting a starting phase as a phase identified in the majority of trials; and
starting the DC motor.

2. The method of claim 1 wherein identifying the phase having the shortest time period comprises:

storing a time period in a memory from a first measurement;
for each of the plurality of phases:
    comparing the measured time period for the phase with the time period stored in the memory; and
    removing the time period stored in the memory from the memory and storing the time period for the phase in the memory if the time period for the phase is less than the time period stored in the memory.

3. The method of claim 1, further comprising:

for each of the trials storing in a memory an identity of the phase identified as having the shortest time period.

4. The method of claim 1, further comprising:

reducing the predetermined threshold if the time period for the phase exceeds a maximum time period.

5. The method of claim 1 wherein starting the DC motor comprises:

selecting an elevated threshold;

introducing a current into the starting phase; and terminating the current in the starting phase and introducing current into a third phase, the third phase being two phases removed from the starting phase.

6. The method of claim 2, further comprising:

coupling the coils to a ground.

7. A method for detecting a position of a rotor in a DC motor having a plurality of coils and being operated in a plurality of phases, the rotor having a position relative to one of the phases, the method comprising:

for each of a preselected odd number of trials, determining a phase which is located closest to the position of the rotor by introducing a current pulse into each phase;

identifying a phase which is determined to be closest to the position of the rotor in a majority of the trials, the phase having a shortest current rise time; and applying a torque-producing current to the identified phase to start the DC motor.

8. The method of claim 7 wherein determining a phase which is located closest to the position of the rotor comprises:

for each of the plurality of phases:
  introducing a current into the phase;
  measuring a time period for the phase between the introduction of the current into the phase and an instant when the current in the phase exceeds a predetermined threshold;
  terminating the current in the phase;
identifying a phase having a shortest time period.

9. The method of claim 8 wherein identifying a phase having the shortest time period comprises:

for each of the plurality of phases:
  comparing the time period with a previously established time period; and
  storing in a memory the shortest of the two time periods and an identity of a phase with which the shortest time period is measured.

10. The method of claim 8 wherein measuring a time period further includes coupling the coils to a ground.

11. A circuit for starting a rotor in a DC motor, the DC motor having a plurality of coils and being operated in a plurality of phases, the rotor having a position relative to one of the phases, the circuit comprising:

a logic circuit;

a sequencer circuit structured to receive a signal from the logic circuit and to generate information;

a driver circuit structured to receive the information generated by the sequencer circuit and to provide current to selected phases of the motor based on the information;

an amplifier coupled to the driver circuit and being structured to generate a signal based on current in the coils;

a comparator structured to receive the signal generated by the amplifier and a speed control signal, the comparator generating a signal when the signal generated by the amplifier exceeds the speed control signal;

a counter structured to receive the signal generated by the comparator and a signal from the logic circuit, the counter being structured to start a count in response to the signal from the logic circuit and to terminate the count in response to the signal generated by the comparator;

a memory structured to receive the count from the counter and to communicate with the logic circuit; and wherein the logic circuit is structured to determine a position of the rotor relative to the phases by directing current to be initiated into each of the phases in a sequence and reading a count for each phase generated by the counter from the memory, the count being based on a time period for each phase between the initiation of current in the phase and an instant when the current rises to a threshold, the position of the rotor being determined to be closest to a phase having a shortest time period.

12. The circuit for starting a rotor in a DC motor of claim 11 wherein the driver circuit comprises pairs of driving transistors coupled to corresponding coils of the DC motor.

13. The circuit for starting a rotor in a DC motor of claim 11 wherein the driver circuit generates control signals to couple the coils to ground after the current rises to the threshold.

14. A method for detecting a position of a rotor in a DC motor having a plurality of coils and being operated in a plurality of phases, the rotor having a position relative to one of the phases, the method comprising:

for each of a preselected odd number of trials, determining a phase which is located closest to the position of the rotor; and identifying a phase which is determined to be closest to the position of the rotor in a majority of the trials, wherein determining a phase which is located closest to the position of the rotor comprises:

for each of the plurality of phases:
  introducing a current into the phase;
  measuring a time period for the phase between the introduction of the current into the phase and an instant when the current in the phase exceeds a predetermined threshold;
  terminating the current in the phase;
identifying a phase having a shortest time period.

15. The method of claim 14 wherein identifying a phase having the shortest time period comprises:

for each of the plurality of phases:
  comparing the time period with a previously established time period; and
  storing in a memory the shortest of the two time periods and an identity of a phase with which the shortest time period is measured.

16. The method of claim 14 wherein measuring a time period further includes coupling the coils to a ground.

* * * * *